(12) United States Patent
Saber et al.

(10) Patent No.: US 12,244,141 B2
(45) Date of Patent: Mar. 4, 2025

(54) SYSTEM AND METHOD FOR FAST FEEDER HOSTING CAPACITY AND MITIGATION

(71) Applicant: OPERATION TECHNOLOGY, INC., Irvine, CA (US)

(72) Inventors: Ahmed Saber, Foothill Ranch, CA (US); Tanuj Khandelwal, Riverside, CA (US)

(73) Assignee: OPERATION TECHNOLOGY, INC., Irvine, CA (US)

( * ) Notice: Subject to any disclaimer, the term of this patent is extended or adjusted under 35 U.S.C. 154(b) by 583 days.

(21) Appl. No.: 17/242,140

(22) Filed: Apr. 27, 2021

(65) Prior Publication Data

US 2021/0351611 A1    Nov. 11, 2021

Related U.S. Application Data

(63) Continuation of application No. PCT/US2020/036504, filed on Jun. 5, 2020.

(60) Provisional application No. 62/858,247, filed on Jun. 6, 2019.

(51) Int. Cl.
| | |
|---|---|
| H02J 13/00 | (2006.01) |
| G05B 19/042 | (2006.01) |
| H02J 3/38 | (2006.01) |

(52) U.S. Cl.
CPC ...... *H02J 13/00002* (2020.01); *G05B 19/042* (2013.01); *H02J 3/381* (2013.01); *G05B 2219/2639* (2013.01); *H02J 2300/20* (2020.01)

(58) Field of Classification Search
CPC .. H02J 13/00002; H02J 3/381; G05B 19/042; G05B 2219/2639

USPC ...................................................... 700/295
See application file for complete search history.

(56) References Cited

U.S. PATENT DOCUMENTS

| | | |
|---|---|---|
| 2014/0172125 A1 | 6/2014 | Shokooh et al. |
| 2015/0188415 A1 | 7/2015 | Abido et al. |
| 2020/0091765 A1* | 3/2020 | Bahramirad ......... G01R 21/133 |

OTHER PUBLICATIONS

IET Renewable Power Generation; Simultaneous optimisation of photovoltaic hosting capacity and energy loss of radial distribution networks with open unified power quality conditioner allocation, By: Lakshmi, Feb. 2018 (Year: 2018).*
IET Generation, Transmission & Distribution, Modelling and allocation planning of voltage sourced converters to improve the rooftop PV hosting capacity and energy efficiency of distribution networks, By: Ganguly, Dec. 2017 (Year: 2017).*
IEEE: Improving Distribution Network PV Hosting Capacity via Smart Inverter Reactive Power Support, By: Seuss (Year: 2015).*
IEEE: Technologies to Increase PV Hosting Capacity in Distribution Feeders, By: Ding (Year: 2016).*
Coogan et al., "Locational Dependence of PV Hosting Capacity Correlated with Feeder Load" In: 2014 IEEE PES T&D Conference and Exposition, Apr. 17, 2024.
Seuss et al., "Improving Distribution Network PV Hosting Capacity via Smart Inverter Reactive Power Support" In: In: 2015 IEEE Power & Energy Society General Meeting, Jul. 20, 2015.

(Continued)

*Primary Examiner* — Jigneshkumar C Patel
(74) *Attorney, Agent, or Firm* — One LLP

(57) ABSTRACT

Provided are embodiments of systems, devices and methods for improved optimization of FHC using a swarm optimization based intelligent scenario selection from local search (small step) and global search (large step) experiences for faster and better FHC.

15 Claims, 7 Drawing Sheets

(56) References Cited

OTHER PUBLICATIONS

Sun et al., "An Improved Convergence Particle Swarm Optimization Algorithm with Random Sampling of Control Parameters" In: Journal of Control Science and Engineering, Jun. 2, 2019.
Zhang et al., "A Comprehensive Survey on Particle Swarm Optimization Algorithm and Its Applications" In: Mathematical Problems in Engineering, Feb. 12, 2015.

* cited by examiner

One-line diagram of a distribution system with PV

Max system voltage for intelligent and random selections

Voltage spectrum for feeder hosting capacity

FHC with and without smart inverter (40% LDF)

FHC with and without smart inverter (70% LDF)

SYSTEM AND METHOD FOR FAST FEEDER HOSTING CAPACITY AND MITIGATION

CROSS REFERENCE TO RELATED APPLICATION

The present application is a continuation of PCT International Application No. PCT/US2020/036504, filed Jun. 5, 2020, which claims priority to U.S. Provisional Application No. 62/858,247, filed Jun. 6, 2019, the disclosures of both of which are hereby incorporated by reference in their entirety for all purposes.

FIELD

The subject matter described herein relates generally to systems, devices, and methods for feeder hosting capacity, and more particularly, to feeder hosting capacity and mitigation by smart inverter using swarm optimization based intelligent selection.

BACKGROUND

Large penetration of renewable energy (RE) is highly expected for sustainable green energy system. RE includes photovoltaic (PV), wind energy and so on. However, in an existing feeder, the amount of RE accommodation is limited because of utility-established acceptable voltage limit, voltage unbalance, transformer rating, line thermal overloading limit, regulation equipment, protection co-ordination, feeder configuration, load profile and more.

Renewable energy (RE) is mostly intermittent and non-dispatchable. Additionally, distributed RE back flows power to the grid and the grid was not designed for that. Therefore, high RE penetration brings technological challenges to the existing power grid, such as voltage rise, thermal overloading, protection malfunctions, power quality issues and so on. Rooftop small scale PV system is being continuously added in distribution system every day without thorough analysis of its impact. Most utilities accept a 15% PV penetration threshold with respect to peak load. However, this criterion does not take into account PV locational impact or individual feeder characteristics.

It is important for feeder operation and planning to calculate the amount of RE that can be hosted inside an existing feeder subject to satisfy voltage limit, thermal limit, and protection criteria—often referred to as feeder hosting capacity (FHC). However, current FHC technologies and their calculations are not optimized.

Thus, needs exist for systems, devices, and methods for improved optimization of feeder hosting capacity.

SUMMARY

Provided herein are example embodiments of systems, devices and methods for improved optimization of FHC using a swarm optimization based intelligent scenario selection from local and global search experiences for faster and better FHC. In some embodiments, local search may be performed from self-experience. In some embodiments, global search may be conducted from self and neighboring experiences.

In some embodiments, the present disclosure may include a computer-based and swarm-optimization based intelligent selection method for faster and better convergence of feeder hosting capacity (FHC), comprising: performing local search near region transition and global search; calculating at least one of a local max voltage node ($P_{best}$) and a global max voltage node ($G_{best}$) using swarm based intelligent node selection for all loading and penetrations levels; and solving at least one of unbalance load flow (LF), short circuit (SC) and harmonics analysis (HA).

In some embodiments, the present disclosure may include a system for faster and better convergence of feeder hosting capacity (FHC) using swarm-optimization based intelligent selection method, the system comprising: at least one processor; and a non-transitory computer-readable medium including computer-executable program instructions; wherein, when the computer-executable program instructions are executed by the at least one processor, the at least one processor: performs a local search near region transition; calculates at least one of a local max voltage node ($P_{best}$) and a global max voltage node ($G_{best}$) using swarm based intelligent node selection for all loading and penetration levels; and solves at least one of unbalance load flow (LF), short circuit (SC) and harmonics analysis (HA).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional features and advantages of the invention will be set forth in the descriptions that follow, and in part will be apparent from the description, or may be learned by practice of the invention. The objectives and other advantages of the invention will be realized and attained by the structure particularly pointed out in the written description, claims and the appended drawings.

BRIEF DESCRIPTION OF THE DRAWINGS

The present invention may be better understood by referring to the following figures. The components in the figures are not necessarily to scale. Emphasis instead being placed upon illustrating the principles of the disclosure. In the figures, reference numerals designate corresponding parts throughout the different views.

DETAILED DESCRIPTION

Figure 1:
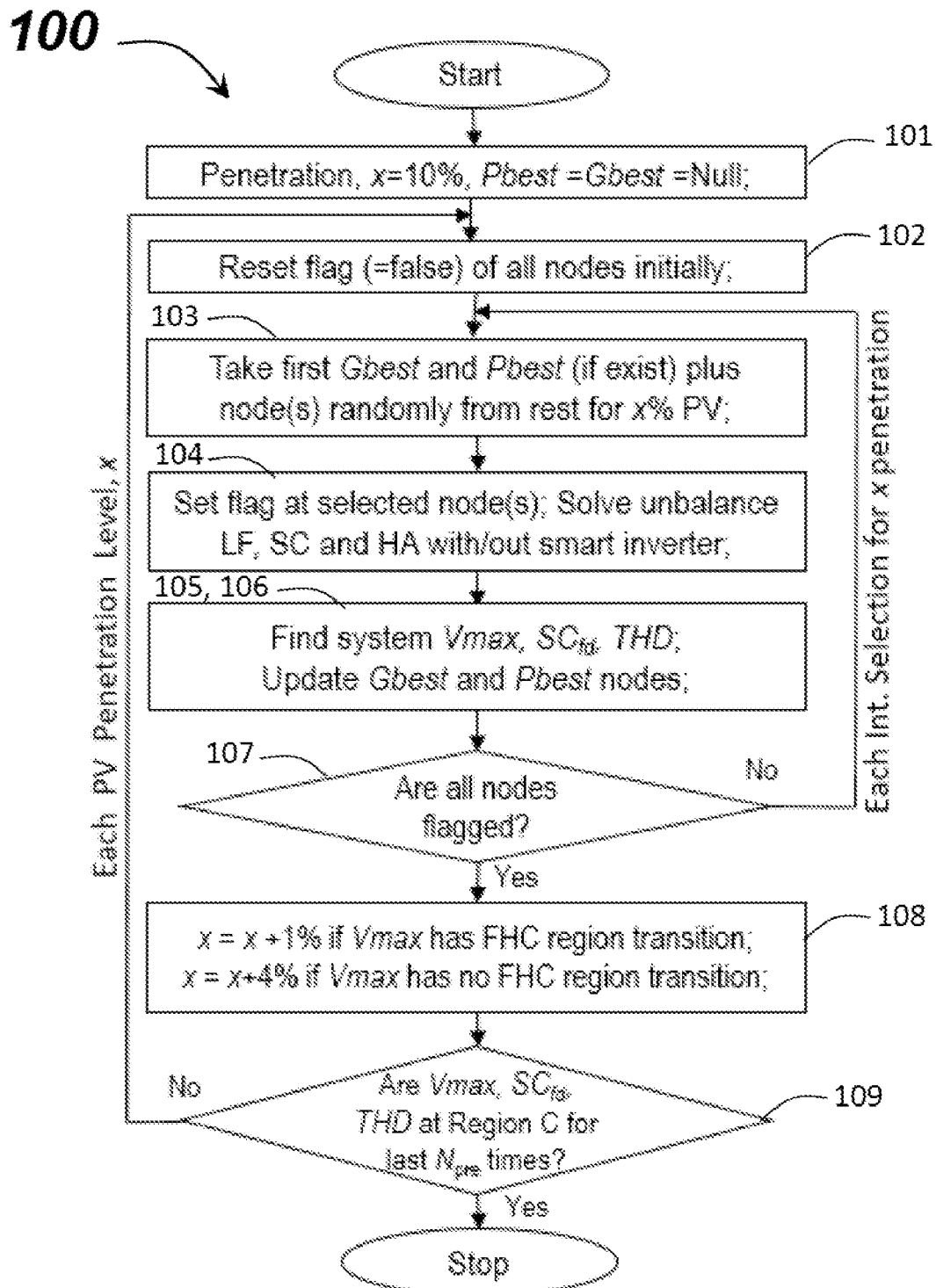
FIG. 1 illustrates an exemplary process chart of a feeder hosting capacity (FHC) with or without smart inverter using swarm-based intelligent selection, according to some embodiments of the present invention.

The following disclosure describes various embodiments of the present invention and method of use in at least one of its preferred, best mode embodiment, which is further defined in detail in the following description. Those having ordinary skill in the art may be able to make alterations and modifications to what is described herein without departing from its spirit and scope. While this invention is susceptible to different embodiments in different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

In the following description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein and in the appended claims, the singular forms "a," "an," and "the" include plural referents unless the context clearly dictates otherwise.

In general, terms such as "coupled to," and "configured for coupling to," and "secure to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

Generally, renewable energy (RE) connected through smart inverters can control real and reactive power output; thus, they can mitigate feeder hosting capacity (FHC) limitation up to a certain limit. RE has uncertainty due to inherent nature and further, RE ramp rate is much faster than regulator response time. Therefore, it is common practice to consider worst-case scenario. FHC is a complex power system optimization problem. It is difficult to explore all possible scenarios in a practical timeframe. Multiple predefined scenarios may be generated from random Monte Carlo simulation but are not optimized. The systems, devices and methods of the present disclosure include, among others, a swarm optimization based intelligent scenario selection from local search (small step) and global search (large step) experiences for faster and better FHC. Simulations were performed and results have shown effectiveness of the systems, devices and methods of the present disclosure.

High photovoltaic (PV) penetration induces voltage rise due to reverse power flow caused by PV power. However, at least the American National Standards Institute's ANSI C84.1-2016 recommends that the voltage of residential loads should remain within ±5% from its nominal value under normal operating conditions.

High penetration of distributed energy resources ((DER) e.g., PV, wind energy and so on) has potential impact on distribution system. The amount of DER a feeder can accommodate depends upon many factors including, for example, DER characteristics, location of the DER along the feeder, feeder operating criteria and control mechanisms, and electrical proximity of DER to other DER systems. A feeder response may be checked to determine the total amount of DER that will cause an adverse impact to the feeder. Feeder hosting capacity (FHC) or Hosting Capacity Analysis (HCA) is the amount of DER that can be accommodated at a given time and at a given location. The capacity must exist to 'host' DER without adversely affecting power quality or reliability under current configurations and without feeder upgrades or modifications. FHC is feeder specific, location dependent and time varying. For DER penetration, FHC may not allow voltage violations, thermal overloads, protection malfunctions and decreased quality/reliability. High penetration also needs excessive regulator operations. To calculate all those mentioned factors for FHC, the systems, devices and methods of the present disclosure may include a detailed and accurate model of entire distribution system. FHC study may also help utilities to make timely decisions for PV interconnection requests and ensure that distribution grids continue to operate reliably.

Some state regulations, for example California Rule 21, require the use of smart inverters in DERs. Utilities are introducing smart inverters to increase feeder hosting capacity. Smart inverters have different operating modes: volt-var, volt-watt and freq-watt. Smart inverters provide flexible PV operations. They provide or absorb reactive power and control real power depending on current operating conditions for grid support.

The Electrical Power Research Institute (EPRI) is currently putting multiple efforts throughout the U.S. to assess how future high penetration DER integrates into distribution feeders of various types, load mixes, and solar characteristics. FHC may dynamically change over time due to normal feeder growth and reconfiguration.

Different methods may be used to determine feeder hosting capacity. Some methods are stochastic, which need long time to evaluate all scenarios. For example, feeder hosting capacity may be calculated at the end of the feeder which does not explore all areas. Some methods run selected scenarios of extreme cases only. Moreover, FHC considering smart inverter is very complex.

Generally, the present disclosure provides systems, devices and methods for improved optimization of FHC using a swarm optimization based intelligent scenario selection from local search (small step) and global search (large step) experiences for faster and better FHC. In some embodiment, the systems, devices and methods of the present disclosure may include swarm-based methods, e.g., particle swarm optimization (PSO), which has a guided search property for optimization. It may be easy to implement and may not require gradient information of objective functions. It can explore more search spaces and can avoid local optima gradually. Complete AC load flow may be solved for each scenario to obtain accurate analysis. Multicore parallel processing may be utilized in these calculations for faster execution.

The present disclosure may also include intelligent selection to explore higher voltage worse case scenarios more than typical random selection. DER with smart inverter can increase feeder hosting capacity and provide grid support. Considering recent high distributed renewable energy penetrations, feeder hosting capacity is an important tool to operate a feeder under utility-established thresholds without any adverse impact. With the systems, devices and methods of the present disclosure, a feeder may have sufficient feeder hosting capacity so that its customers can add their own DER in the system. Feeder hosting capacity may be recalculated over time as feeder configuration, loading and equipment are changed. It indicates the feeder potential for maximum green power export to utility. In addition, FHC results may also be used to make plan for required feeder update.

In some aspects, feeder hosting capacity is generally the amount of DER and location that can be accommodated without adverse impact under current configurations and without feeder upgrades or modifications. FHC may not be a straightforward process nor a single value for any given feeder. FHC analysis of the present disclosure may include, for example:
  size of DER,
  location of DER,
  feeder characteristics,
  electrical proximity to other DER,
  unique solar resource characteristics in the area,
  DER control,
  smart inverter,
  protective coordination,
  regulation equipment (switch cap, voltage regulator, inverter) control, and
  feeder configuration,
  etc.

In some aspects, feeder hosting capacity may be a power system optimization problem. In FHC, DER locations and sizes may be state variables. An objective of the present disclosure may include maximizing total DER size, subject to all electrical, physical, technical and operational limits.

Renewable energy penetration is increasing every day. DER penetration increases back flow. Thus, the present disclosure may consider DER penetration during a feeder design phase. High DER penetration has, for example, the following impacts:
  voltage,
  thermal loading,
  protection,
  reliability and
  power quality,
  etc.

In some current operations, scenarios are generated randomly for each RE penetration level. FHC is the worst-case scenario. It takes many trials to reach the worst case or a near worst case scenario from random selection. There are many scenarios for every level of RE penetration. For each scenario, load flow (LF), short circuit (SC) and harmonics analysis (HA) can be solved. The maximum voltages, short circuit currents and total harmonics distortion of the scenarios are plotted with respect to increasing penetration for visualization. As thousands of random scenarios are possible, the random selection method is not feasible even for a medium size distribution system.

In some embodiments, DERs may be connected with smart inverters. Smart inverters may have different modes to support grid operation. These modes may include, for example:
  Volt-VAr,
  Volt-Watt,
  Freq-Watt,
  etc.

Distribution voltage goes high when DER back flows power to a grid. Additionally, inventers always want higher penetration of RE. Therefore, real and reactive powers of DER may be controlled through smart inverter to increase feeder hosting capacity.

In some embodiments, the present disclosure may include a swarm optimization based intelligent scenario for RE penetration in the FHC method. In some embodiments, it may be based on particle swarm optimization. The nodes where RE can be installed may be indicated as state variable nodes [N1, N2, ..., Nn]. RE size at each state variable node may be pre-defined or calculated from connected loads or PV inverters. For each penetration level, a local max voltage node ($P_{best}$) and a global max voltage node ($G_{best}$) may be maintained to explore a new scenario. $G_{best}$ is the max voltage node of all previous scenarios. $P_{best}$ is the max voltage node of current scenario only. If $P_{best}$ is the same as $G_{best}$, the present disclosure may take the next highest voltage node as $P_{best}$. To generate scenarios for a specific amount of RE penetration, $G_{best}$ and P best nodes may be taken first with probability one. Then others may be selected randomly from state variable nodes to fulfil the penetration level. A complete unbalance load flow, SC and HA may be solved for the explored intelligent scenario's accurate results.

FIG. 1 illustrates an exemplary process chart 100 of FHC with or without smart inverter using swarm-based intelligent selection, according to some embodiments.

In some embodiments, the FHC method of the present disclosure may include the following process as illustrated in pseudo code.

At Step 101: Calculate max system load Dmax. Get state variable nodes [N1,N2, ..., Nn]. Penetration x=10% (of Dmax) DER. Assign Pbest=Gbest=Null.

At Step 102: Reset all nodes, flag[N1,N2, ..., Nn]=false.

At Step 103: Pick $G_{best}$ and $P_{best}$ nodes first. Then take random nodes. [n1,n2, ..., ni] from rest of the nodes to fulfil x % penetration.

At Step 104: Set DER at [Gbest,Pbest,n1,n2, ..., ni] and set flag[Gbest,Pbest,n1,n2, ..., ni]=true. Each PV size depends on utility regulation and/or penetration level.

At Step 105: Solve unbalanced LF, SC and HA. Find system max voltage Vmax (Max system voltage after any PV penetration), short circuit current at feeder SCfd, and total harmonics distortion THD for x % DER penetration.

At Step 106: Depending on Vmax, SCfd and THD, update Gbest and Pbest.

At Step 107: Go to Step 103 if at least one node from [N1,N2, ..., Nn] is not yet flagged (selected).

At Step 108: Increase penetration x by small (for example, 1%) step if Vmax is in region transition; otherwise, increase penetration x by large (for example, 4%) step.

At Step 109: If Vmax of all scenarios are at Region C (an unacceptable region) for a predefined Npre (predefined number of trials at Region C) consecutive penetration levels then stop; otherwise, go back to Step 102.

In some exemplary applications, the method and process in FIG. 1 and the example pseudo code have been shown to advantageously take less number of trials than random selection to explore the worst or near to the worst case scenario.

The numerical values mentioned in the process chart and pseudo-code are examples chosen from previous experiences. They are not meant to be limited or limiting. Steps 103 and 104 of the pseudo code example may include PSO inspired $G_{best}$ and $P_{best}$.

It should be noted that the process chart and pseudo-code may be applied to cases where the DER is without smart inverter, and also to cases where the DER is with smart inverter. In the case of DER with smart inverter, real and reactive power outputs of DER may follow IEC 61850 smart inverter modes. Depending on system voltage and frequency, VAr and watt of DER may be changed dynamically. On the other hand, DER without smart inverter may not have any output control and may generate power at unity or a predefined fixed power factor.

Simulation Results

Figure 2:
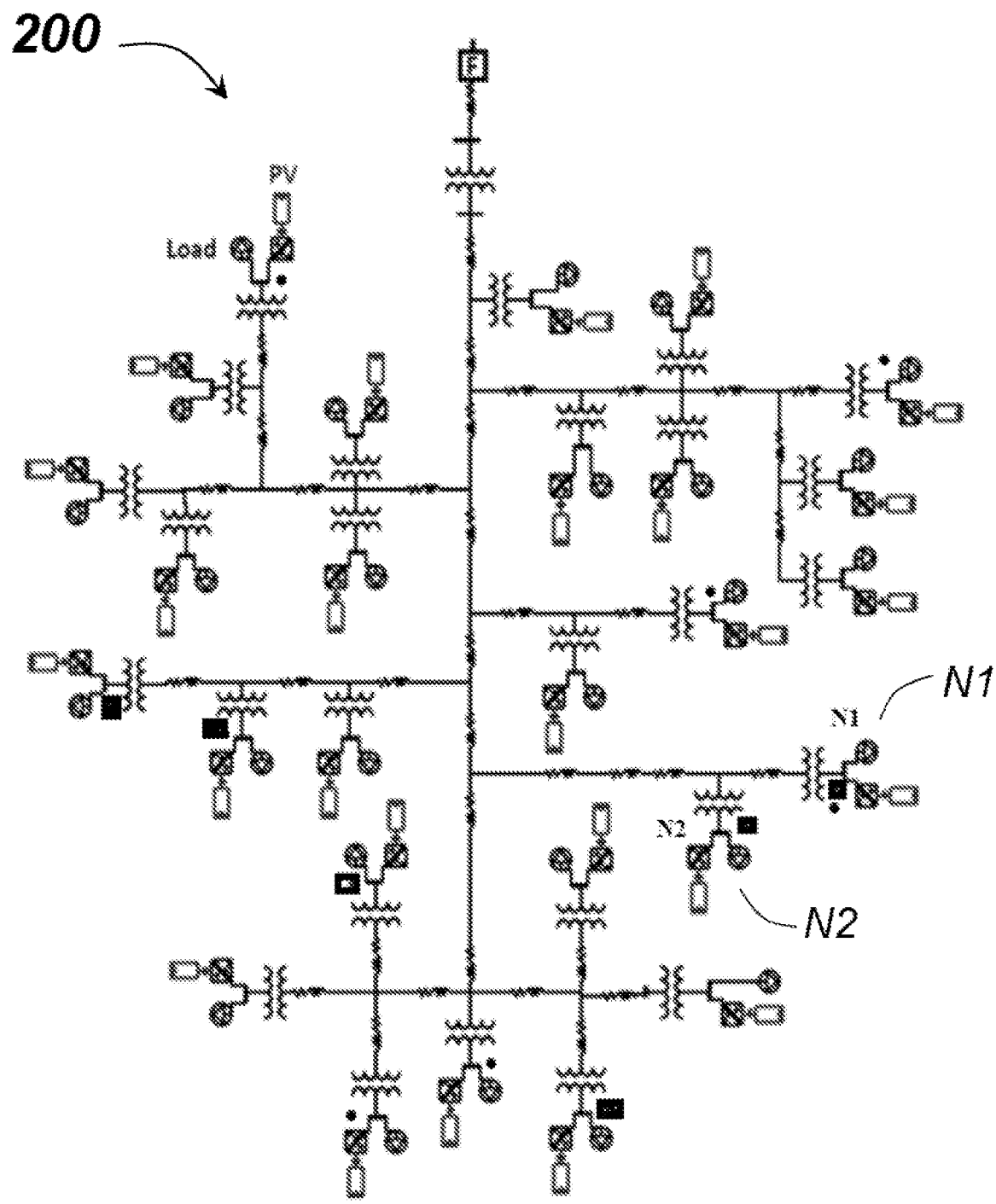
FIG. 2 illustrates exemplary one-line diagram of a distribution system with photovoltaic (PV), according to some embodiments of the present invention.

Utility-established max voltage threshold plays an important role in FHC. For example, according to ANSI standard, maximum 105% voltage is acceptable at customer end. As part of the development of the systems, devices and methods of the present disclosure, a residential distribution feeder of 1477 kW max unbalanced loading is investigated. An exemplary one-line diagram of a distribution system 200 with PV is shown in FIG. 2. The feeder may be modelled by 70 nodes using, for example, an ETAP modelling system (from Operation Technology, Inc, at https://etap.com). All loads are connected at secondary side of distribution transformers. GIS co-ordinates and branch impedances are not shown for simplicity. PVs are installed at rooftops behind the meters. Therefore, a system of DC PV with inverter is connected at each load node for simulation. However, the PV size is set to zero if the connected node of that PV is not selected for renewable energy penetration in simulation process.

In the worst-case scenario, PV can ramp from zero to full output instantly; however, voltage regulating devices, e.g., sub-station LTC, voltage regulator and switch capacitor, cannot react instantly. Moreover, to compare the method of the present disclosure with methods known in the art, voltage regulating devices are kept constant.

Figure 3:
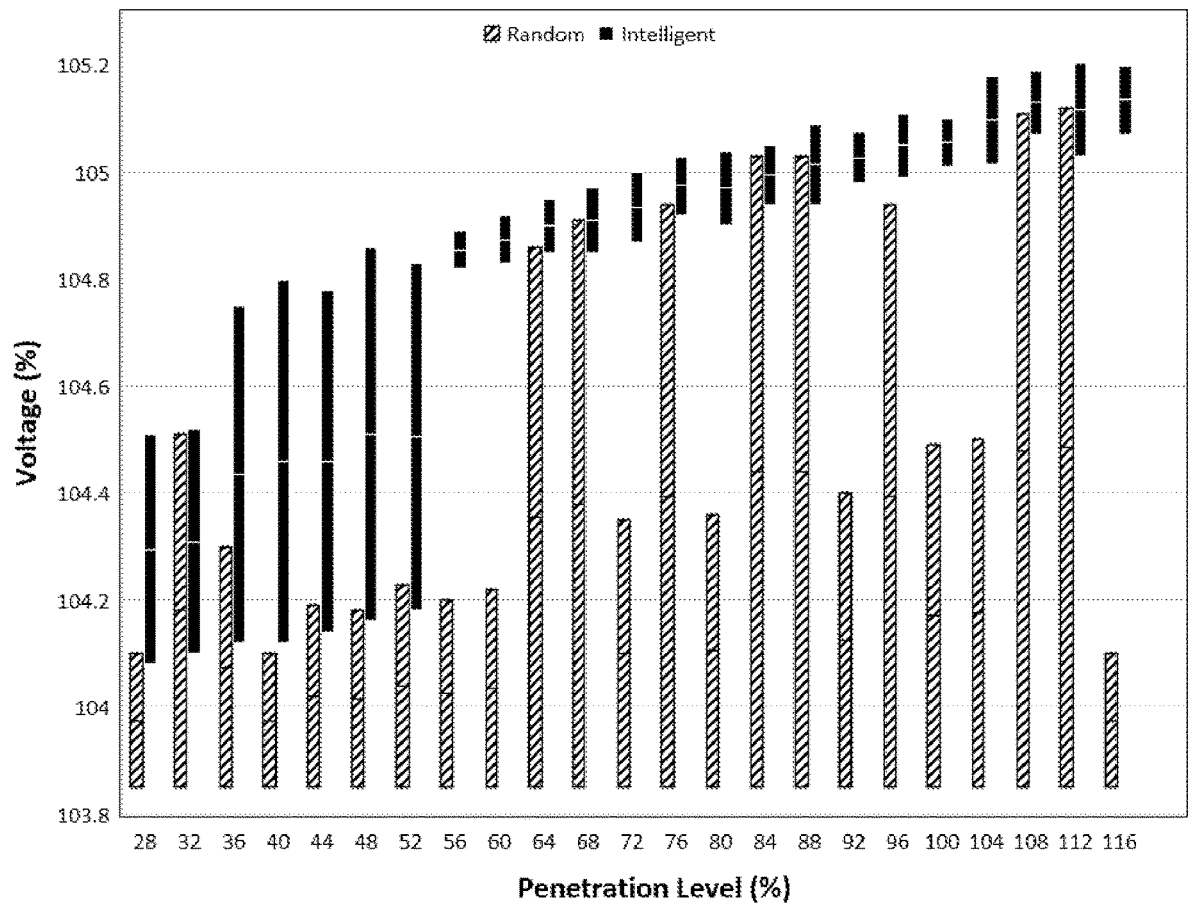
FIG. 3 illustrates exemplary selected penetrations from 28% to 116% chart, according to some embodiments of the present invention.

It should be noted that FHC searches for the worst-case scenario, not the best case scenario. Example selected penetrations from 28% to 116% are shown in FIG. 3 for FHC of the present disclosure (shown as Intelligent) and of random selections. For example, at 40% PV penetration, the swarm-based intelligent method of the present disclosure explores scenarios where system voltage varies from 104.11% to 104.79%. However, for the same 40% PV penetration, the typical random method known in the art explores scenarios where system voltage varies from 103.84% to 104.10%. At 100% PV penetration, system maximum voltage varies from 105.01% to 105.11% and 103.85% to 104.48% for the intelligent method of the present disclosure and the typical random method respectively. Table I shows results of some other PV penetrations. In random selection, system maximum voltage is completely random. Even though penetration is increasing, max voltage is randomly increasing and decreasing. On the other hand, system maximum voltage is continuously increasing with respect to increasing PV penetration in intelligent selection, which is expected. Therefore, the method of the present disclosure is directed and guided selection instead of typical random selection.

TABLE I

SYSTEM VOLTAGE (%) COMPARISON

|  | 32% PV | 40% PV | 60% PV | 80% PV | 100% PV |
| --- | --- | --- | --- | --- | --- |
| Random Selection | 103.84-104.70 | 103.84-104.10 | 103.85-104.22 | 103.85-104.34 | 103.85-104.48 |
| Intelligent Selection | 104.09-104.70 | 104.11-104.79 | 104.84-104.93 | 104.89-105.04 | 105.01-105.11 |

At the beginning of 60% penetration, $G_{best}$ and $P_{best}$ nodes are N1 and N2, respectively in FIG. 2. Usually $G_{best}$ node is the longest distance node from the feeder head with the maximum feedback voltage (104.84% here) over all previous penetration levels. However, $G_{best}$ and $P_{best}$ nodes are continuously updated. On top of $G_{best}$ and $P_{best}$ nodes, the method of the present disclosure selected other nodes randomly and are shown by the black boxes in FIG. 2 for the worst-case scenario of 60% penetration. However, nodes with black dots are selected randomly by typical random method for the worst-case scenario of 60% penetration. In this example, fortunately, it randomly selects $G_{best}$ and thus that result contents the max voltage among other selections.

Table I shows system maximum voltage comparison for different penetration. Swarm-based intelligent selection is very effective as it has both local and global best selection abilities. Therefore, the swarm-based intelligent method always explores expected higher voltage results than typical random method.

Figure 4:
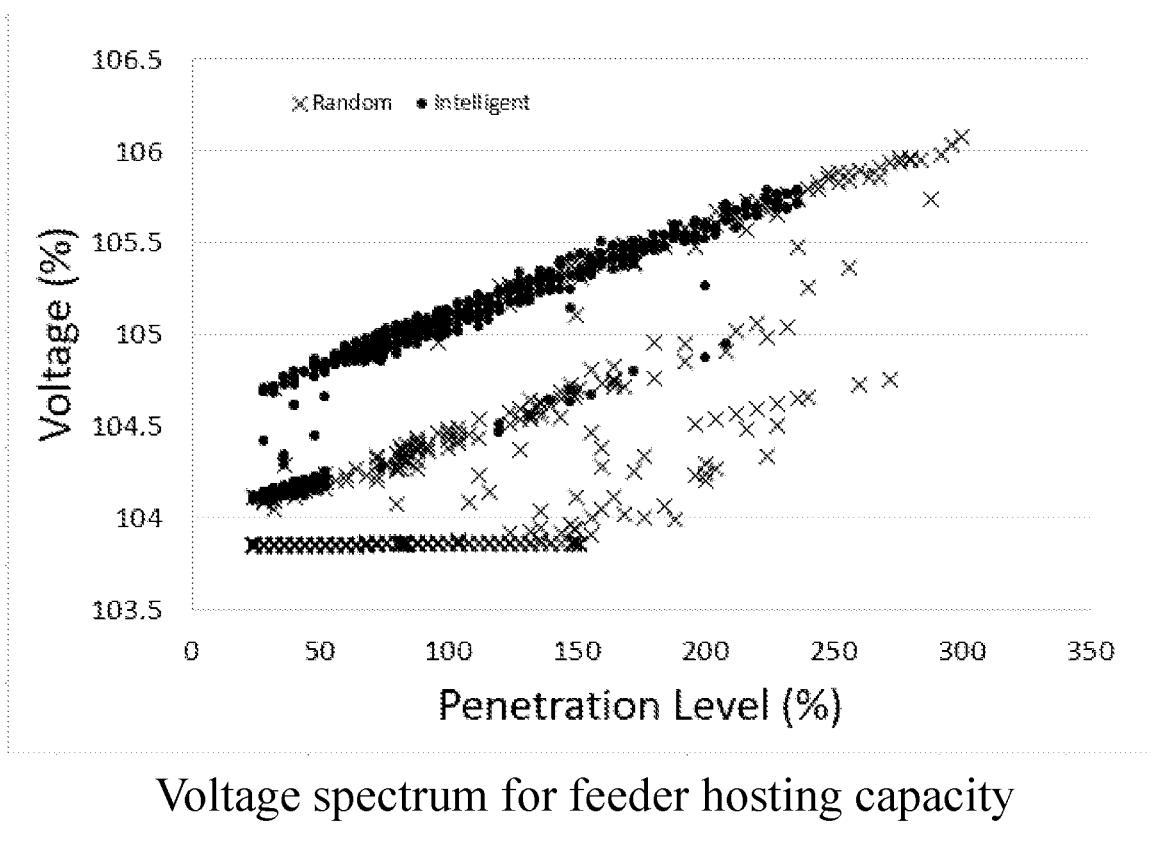
FIG. 4 illustrates an exemplary chart of spectrum of voltage for FHC with respect to PV penetration, according to some embodiments of the present invention.

FIG. 4 shows the spectrum of voltage for FHC with respect to PV penetration. Minimum FHC is 81% penetration of 1477 kW load, i.e., 1196 kW PV power using typical random selection where there is no voltage limit violation. However, minimum FHC is only 73% penetration of 1477 kW load, i.e., 1078 kW PV power using intelligent selection where there is no voltage limit violation up to 73% penetration but voltage violates at 81% penetration. FHC is 1196 kW and 1078 kW using random selection and intelligent selection respectively. Therefore, the method of the present disclosure calculated more conservative and accurate FHC than the random method. Example FHC using random and intelligent selections is reported in Table II.

TABLE II

FEEDER HOSTING CAPACITY COMPARISON

|  | Loading (kW) | FHC (%) | FHC (kW) |
| --- | --- | --- | --- |
| Random Selection | 1477 | 81 | 1196 |
| Intelligent Selection | 1477 | 73 | 1078 |

FIGS. 3 and 4 show how PV penetration affects FHC. Results of intelligent and random selections differ at each penetration level. Significant differences are reported for higher penetrations. Random selection cannot explore worse locations quickly. In limited number of trials, FHC results using random selection are less accurate as many important locations cannot be included in this process. However, the intelligent selection method of the present disclosure advantageously pays attention on worse locations. It explores more critical locations efficiently. Therefore, FHC using the proposed method of the present disclosure is advantageously more accurate.

Figure 5:
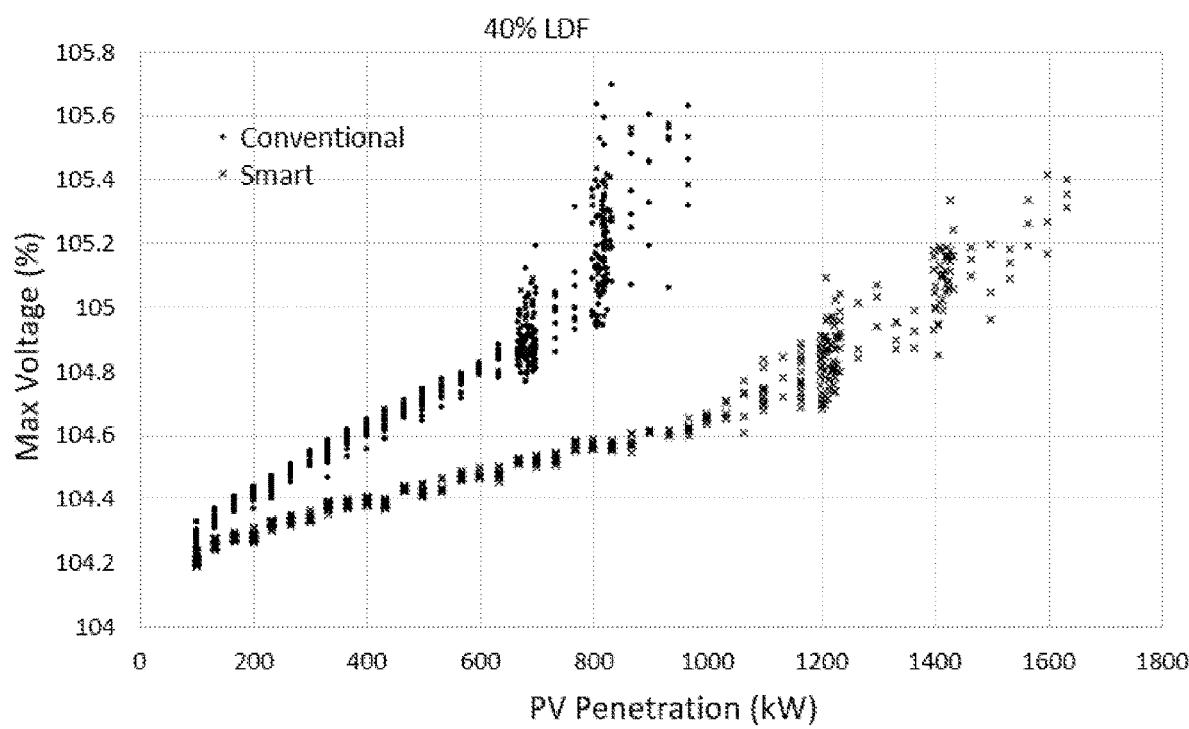
FIGS. 5 and 6 illustrate exemplary charts showing FHC at different load diversity factors (LDFs), according to some embodiments of the present invention.
Figure 6:
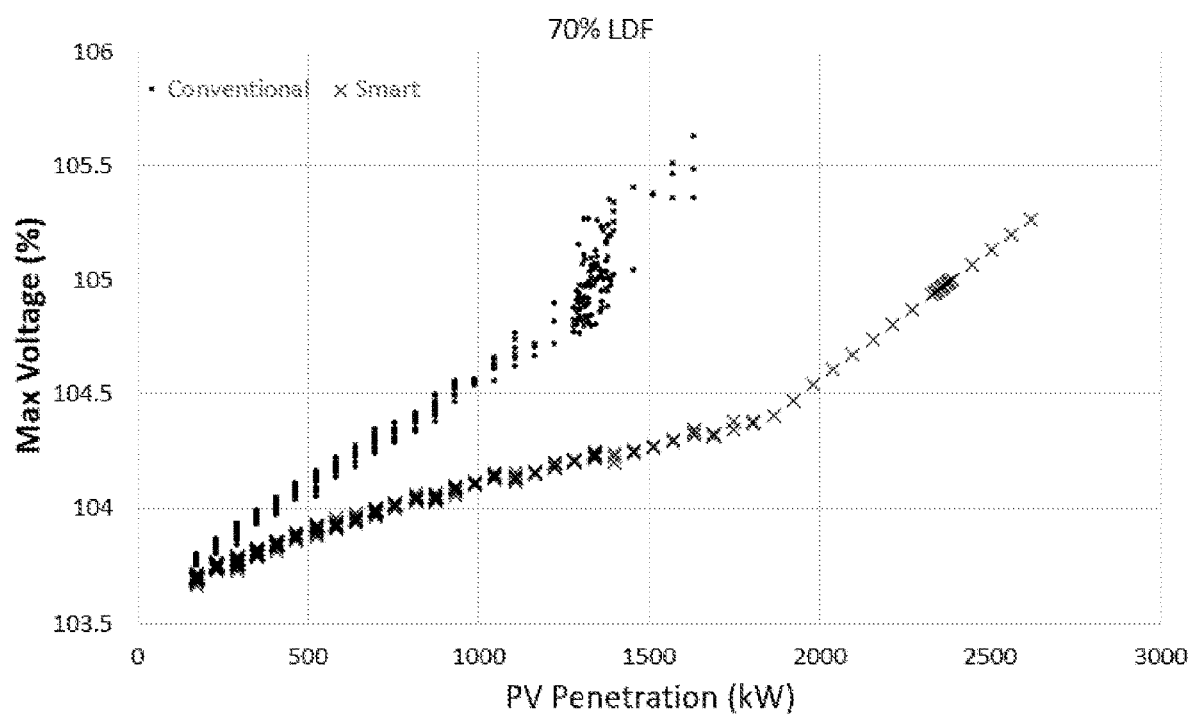

Load dynamically changes over time from day to night, weekdays to weekends, winter to summer and so on. FIGS. 5 and 6 show FHC at different load diversity factors (LDFs). At 40% LDF, minimum PV hosting capacity is only 690 kW without smart inverter where PV inverters generate power at unity power factor. When smart inverter is added with PV to the same system and same LDF, minimum PV hosting capacity jumps to 1200 kW. Smart inverter absorbs reactive power to reduce over voltage. Thus, up to 1200 kW PV penetration, system worst voltage is always below ANSI limit 105%. Similarly, FIG. 6 shows PV hosting capacity results for 70% LDF with or without smart inverter. For higher LDF, most of the nodes are selected at minimum FHC; therefore, maximum FHC (2350 kW) is close to minimum FHC (2400 kW). Results of the proposed FHC of the present disclosure with and without smart inverter are summarized in Table III.

TABLE III

FEEDER HOSTING CAPACITY WITH/WITHOUT SMART INVERTER IN KW

| LDF (%) | Without Smart Inv. | | With Smart Inv. | |
|---|---|---|---|---|
| | Min FHC | Max FHC | Min FHC | Max FHC |
| 40 | 690 | 840 | 1200 | 1400 |
| 70 | 1250 | 1450 | 2350 | 2400 |

PV ramp rate is much faster than regulator response time. Large solar PV can change voltage faster than feeder regulation equipment can respond, thus resulting in potential over voltages. Duration and amount of voltage deviation is significant because in the worst case, PV can ramp from zero to full output instantly before regulation equipment operates (for example, in a minute range). Therefore, minimum FHC is important for operation and planning of a utility.

System Architecture

Figure 7:
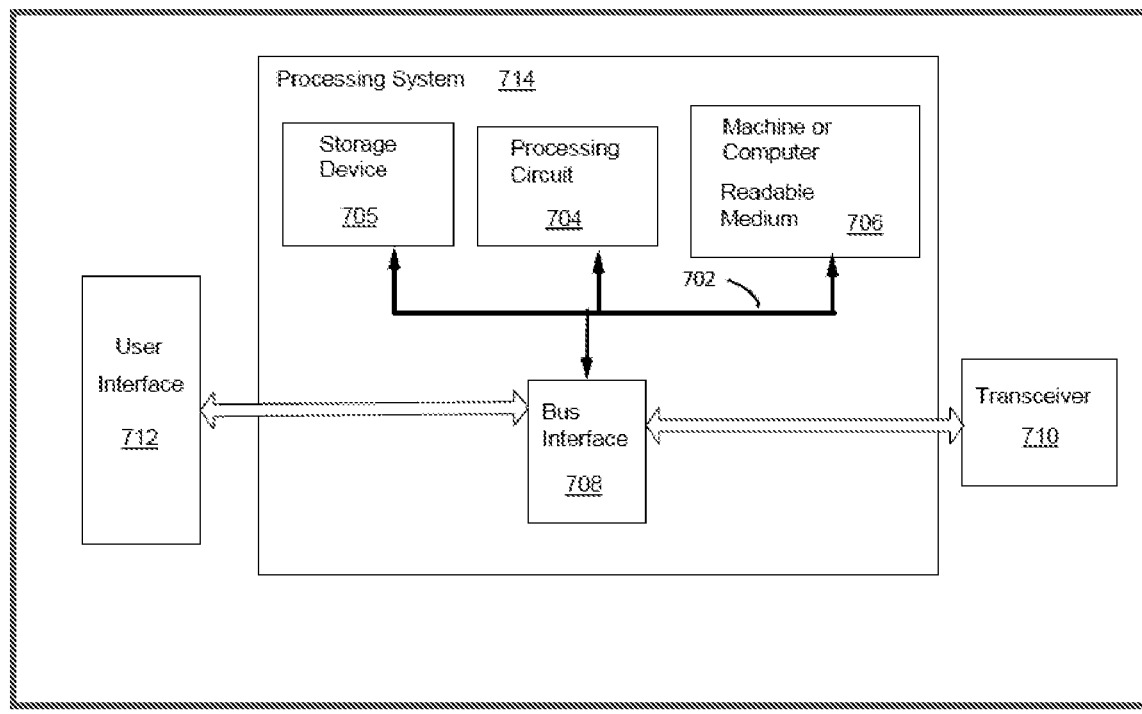
FIG. 7 illustrates an exemplary overall platform 700 in which various embodiments and process steps disclosed herein can be implemented.

FIG. 7 illustrates an exemplary overall platform 700 in which various embodiments and process steps disclosed herein can be implemented. In accordance with various aspects of the disclosure, an element (for example, a host machine or a microgrid controller), or any portion of an element, or any combination of elements may be implemented with a processing system 714 that includes one or more processing circuits 704. Processing circuits 704 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 704 may be used to implement any one or more of the various embodiments, systems, algorithms, and processes described above, for example, as in process 100 of FIG. 1. In some embodiments, the processing system 714 may be implemented in a server. The server may be local or remote, for example in a cloud architecture.

In the example of FIG. 7, the processing system 714 may be implemented with a bus architecture, represented generally by the bus 702. The bus 702 may include any number of interconnecting buses and bridges depending on the specific application of the processing system 714 and the overall design constraints. The bus 702 may link various circuits including one or more processing circuits (represented generally by the processing circuit 704), the storage device 705, and a machine-readable, processor-readable, processing circuit-readable or computer-readable media (represented generally by a non-transitory machine-readable medium 706). The bus 702 may also link various other circuits such as timing sources, peripherals, voltage regulators, and power management circuits, which are well known in the art, and therefore, will not be described any further. The bus interface 708 may provide an interface between bus 702 and a transceiver 710. The transceiver 710 may provide a means for communicating with various other apparatus over a transmission medium. Depending upon the nature of the apparatus, a user interface 712 (e.g., keypad, display, speaker, microphone, touchscreen, motion sensor) may also be provided.

The processing circuit 704 may be responsible for managing the bus 702 and for general processing, including the execution of software stored on the machine-readable medium 706. The software, when executed by processing circuit 704, causes processing system 714 to perform the various functions described herein for any apparatus. Machine-readable medium 706 may also be used for storing data that is manipulated by processing circuit 704 when executing software.

One or more processing circuits 704 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

It should be noted that the present disclosure may be applicable to both transmission and distribution systems. The present may also be applicable to all renewable and non-renewable distributed and central resources.

The present disclosure may include unbalance load flow, short circuit and harmonics analysis studies to provide intelligent scenarios and accurate FHC results.

It should also be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

It is to be understood that this disclosure is not limited to the particular embodiments described herein, as such may, of course, vary. It is also to be understood that the terminology used herein is for the purpose of describing particular embodiments only and is not intended to be limiting.

Various aspects have been presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

What is claimed is:

1. A computer-implemented method for feeder hosting capacity (FHC) in an electrical distribution system, the method comprising:
    performing a local search near a region transition in the electrical distribution system to identify potential optimization areas;
    calculating, using a swarm-based intelligent node selection algorithm, a local maximum voltage node (Pbest) and a global maximum voltage node (Gbest) for all loading and penetration levels in the electrical distribution system;
    solving, based on the calculated Pbest and Gbest, at least one of an unbalance load flow (LF) analysis, a short circuit (SC) analysis, and a harmonics analysis (HA) to determine FHC values; adjusting the electrical distribution system based on the determined optimal FHC values.

2. The computer-based and swarm-optimization based intelligent selection method of claim 1, further comprising mitigating feeder hosting capacity limit, wherein a smart inverter increases feeder hosting capacity and smart inverter modes are applicable to increase feeder hosting capacity.

3. The computer-based and swarm-optimization based intelligent selection method of claim 2, wherein the smart inverter modes include at least one of volt-var, volt-watt and freq-watt.

4. The computer-based and swarm-optimization based intelligent selection method of claim 1, wherein the method is applicable to both transmission and distribution systems.

5. The computer-based and swarm-optimization based intelligent selection method of claim 1, wherein the method is applicable to both renewable and non-renewable distributed and central resources.

6. The computer-based and swarm-optimization based intelligent selection method of claim 1, further includes at least one of unbalance load flow, short circuit and harmonics analysis studies to explore intelligent scenarios and accurate FHC results.

7. The computer-based and swarm-optimization based intelligent selection method of claim 1, further generates more conservative FHC than random Monte Carlo simulation.

8. A system for feeder hosting capacity (FHC) in an electrical distribution system using a swarm-optimization based intelligent selection method, the system comprising:
- at least one processor; and
- a non-transitory computer-readable medium including computer-executable program instructions;
- wherein, when the computer-executable program instructions are executed by the at least one processor, the at least one processor:
  - performs a local search near region transition in the electrical distribution system to identify potential optimization areas,
  - calculates, using a swarm-based intelligent node selection algorithm, a local maximum voltage node (Pbest) and a global maximum voltage node (Gbest) for all loading and penetration levels in the electrical distribution system, and
  - solves, based on the calculated Pbest and Gbest, at least one of an unbalance load flow (LF) analysis, a short circuit (SC) analysis, and a harmonics analysis (HA) analysis, and
  - adjusts the electrical distribution system based on the determined optimal FHC values.

9. The system for faster and better convergence of feeder hosting capacity (FHC) of claim 8, wherein the at least one processor further mitigates feeder hosting capacity limit, wherein a smart inverter increases feeder hosting capacity and smart inverter modes are applicable to increase feeder hosting capacity.

10. The system for faster and better convergence of feeder hosting capacity (FHC) of claim 9, wherein the smart inverter modes include at least one of volt-var, volt-watt and freq-watt.

11. The system for faster and better convergence of feeder hosting capacity (FHC) of claim 8, wherein the system is applicable to both transmission and distribution systems.

12. The system for faster and better convergence of feeder hosting capacity (FHC) of claim 8, wherein the system is applicable to both renewable and non-renewable distributed and central resources.

13. The system for faster and better convergence of feeder hosting capacity (FHC) of claim 8, wherein the at least one processor further includes at least one of unbalance load flow, short circuit and harmonics analysis studies to explore intelligent scenarios and accurate FHC results.

14. The system for faster and better convergence of feeder hosting capacity (FHC) of claim 8, wherein the at least one processor further generates more conservative FHC than random Monte Carlo simulation.

15. The system for faster and better convergence of feeder hosting capacity (FHC) of claim 8, wherein the at least one processor picks local max voltage (Pbest) and global max voltage (Gbest) nodes first, then take random nodes.

* * * * *